(12) United States Patent
Kim et al.

(10) Patent No.: US 9,806,849 B2
(45) Date of Patent: Oct. 31, 2017

(54) METHOD AND APPARATUS FOR FEEDING PARTIAL CQI BACK BY TERMINAL IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 14/957,369

(22) Filed: Dec. 2, 2015

(65) Prior Publication Data

US 2016/0165466 A1 Jun. 9, 2016

Related U.S. Application Data

(60) Provisional application No. 62/087,812, filed on Dec. 5, 2014.

(51) Int. Cl.
| | |
|---|---|
| *H04L 1/00* | (2006.01) |
| *H04L 5/00* | (2006.01) |
| *H04W 76/04* | (2009.01) |
| *H04B 7/06* | (2006.01) |

(52) U.S. Cl.
CPC .......... *H04L 1/0028* (2013.01); *H04L 1/0026* (2013.01); *H04L 5/0057* (2013.01); *H04B 7/0626* (2013.01); *H04L 1/0031* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 9,083,479 B2* | 7/2015 | Etemad | H04W 76/048 |
| 2013/0195008 A1* | 8/2013 | Pelletier | H04B 7/0417 |
| | | | 370/328 |
| 2015/0341942 A1* | 11/2015 | Lee | H04B 7/0626 |
| | | | 370/252 |

* cited by examiner

*Primary Examiner* — Vinncelas Louis
(74) *Attorney, Agent, or Firm* — Dentons US LLP

(57) ABSTRACT

A method of reporting channel state information (CSI) to a base station by a terminal in a wireless communication system is disclosed. Specifically, the method includes configuring feedback chains corresponding to a plurality of CSI-reference signals (RSs) through upper layer signaling, receiving the plurality of CSI-RSs from the base station, calculating a complete channel quality indicator (CQI) for a whole channel using the plurality of CSI-RSs and dividing the complete CQI into partial CQIs corresponding to the respective feedback chains, and reporting CSI items including the partial CQIs to the base station through the feedback chains.

11 Claims, 13 Drawing Sheets

Periodic CSI feedback through PUCCH

FIG. 2
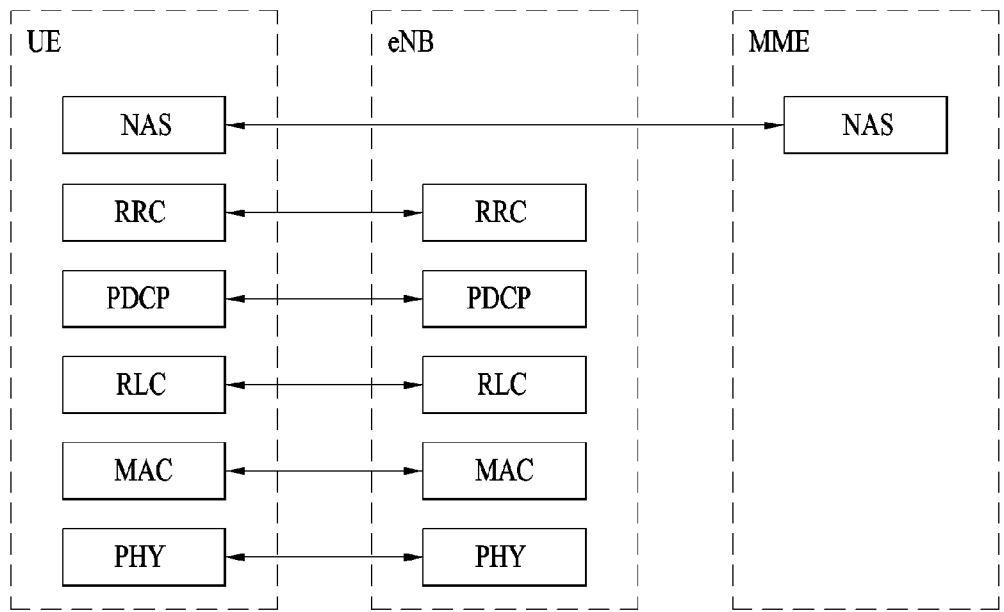
(A) CONTROL-PLANE PROTOCOL STACK
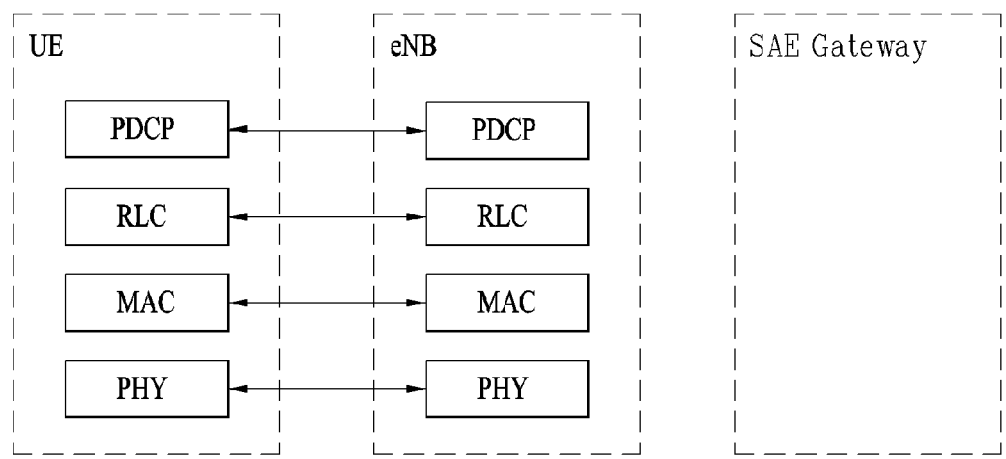
(B) USER-PLANE PROTOCOL STACK

: DMRS GROUP 1

: DMRS GROUP 2

METHOD AND APPARATUS FOR FEEDING PARTIAL CQI BACK BY TERMINAL IN WIRELESS COMMUNICATION SYSTEM

This application claims the benefit of U.S. Provisional Application No. 62/087,812, filed on Dec. 5, 2014, which is hereby incorporated by reference as if fully set forth herein.

BACKGROUND OF THE INVENTION

Field of the Invention

The present invention relates to a wireless communication system, and more particularly, to a method and apparatus for feeding a partial channel quality indicator (CQI) back by a terminal in a wireless communication system.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARM) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to a method and apparatus for feeding a partial CQI back by a terminal in a wireless communication system that substantially obviate one or more problems due to limitations and disadvantages of the related art.

To achieve these objects and other advantages and in accordance with the purpose of the invention, as embodied and broadly described herein, a method of reporting channel state information (CSI) to a base station by a terminal in a wireless communication system includes configuring feedback chains corresponding to a plurality of CSI-reference signals (RSs) through upper layer signaling, receiving the plurality of CSI-RSs from the base station, calculating a complete channel quality indicator (CQI) for a whole channel using the plurality of CSI-RSs and dividing the complete CQI into partial CQIs corresponding to the respective feedback chains, and reporting CSI items including the partial CQIs to the base station through the feedback chains.

Preferably, the method further includes calculating partial rank indicators (RIs) corresponding to the plurality of CSI-RSs, and reporting the partial RIs to the base station through the feedback chains. In this case, the reporting of the partial RIs may include reporting a complete RI for a whole channel through one of the feedback chains.

Meanwhile, in another aspect of the present invention, a method of receiving CSI from a terminal by a base station in a wireless communication system includes configuring feedback chains corresponding to a plurality of CSI-RSs through upper layer signaling, transmitting the plurality of CSI-RSs to the terminal, receiving partial CQIs of a complete CQI for a whole channel calculated using the plurality of CSI-RSs from the terminal through the feedback chains, and acquiring the complete CQI for the whole channel using the partial CQIs.

Here, the method may further include receiving partial RIs corresponding to the plurality of CSI-RSs from the terminal through the feedback chains. In this case, the receiving of the partial RIs may include receiving a complete RI for a whole channel through one of the feedback chains.

In the above aspects, CSI items including the partial CQIs may include information about partial PMIs. In this case, the partial PMIs may include a PMI for a vertical channel and a PMI for a horizontal channel.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a UE and an E-UTRAN based on the 3GPP radio access network specification;

DETAILED DESCRIPTION OF THE INVENTION

Figure 1:
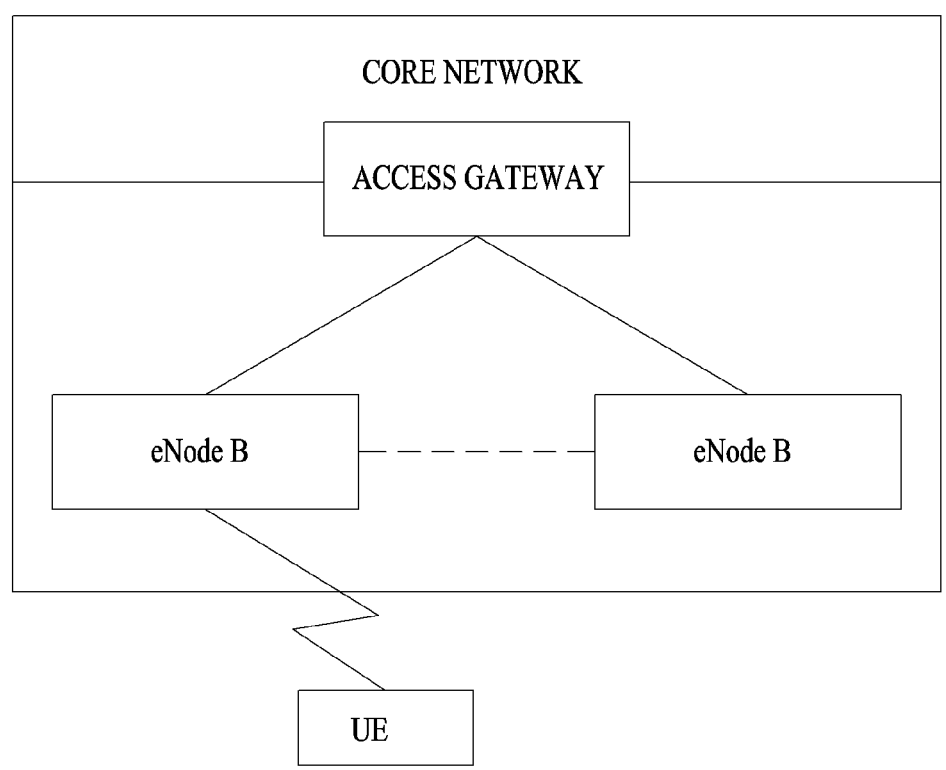
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
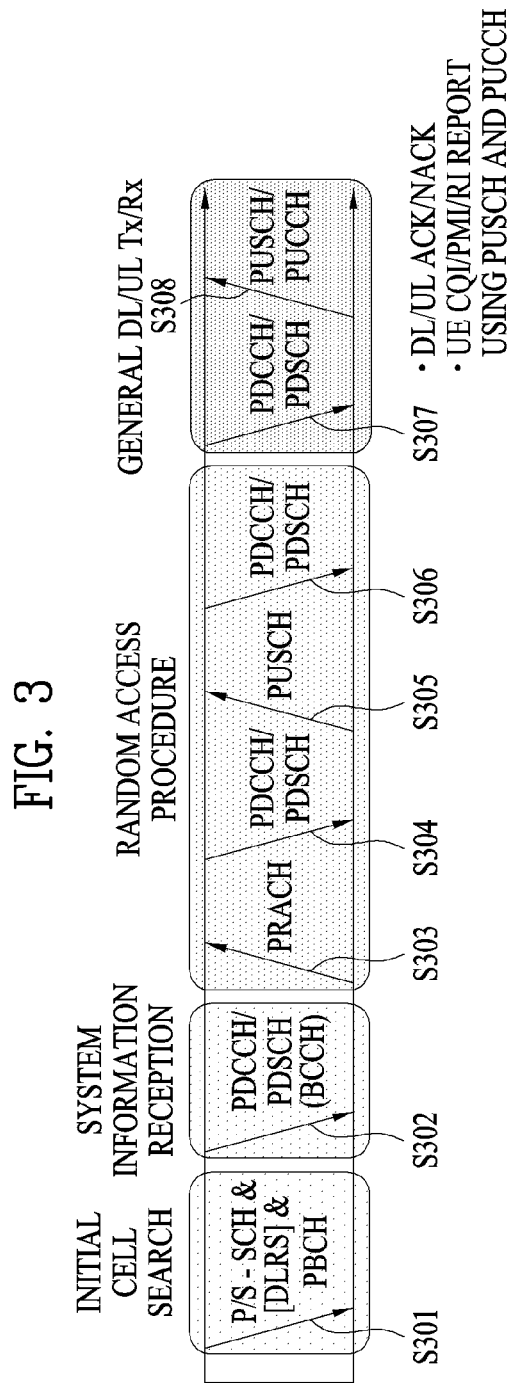
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
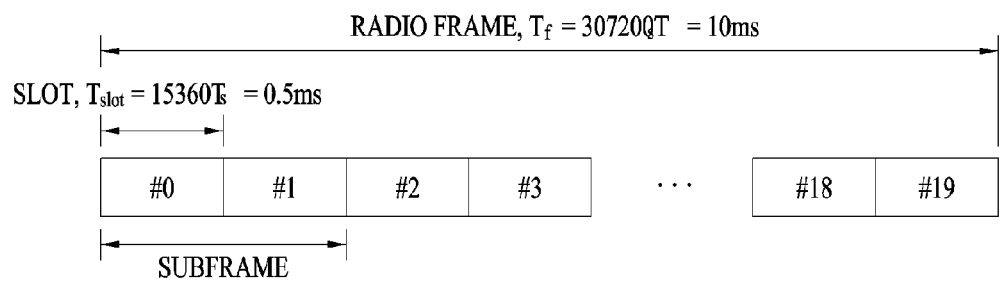
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
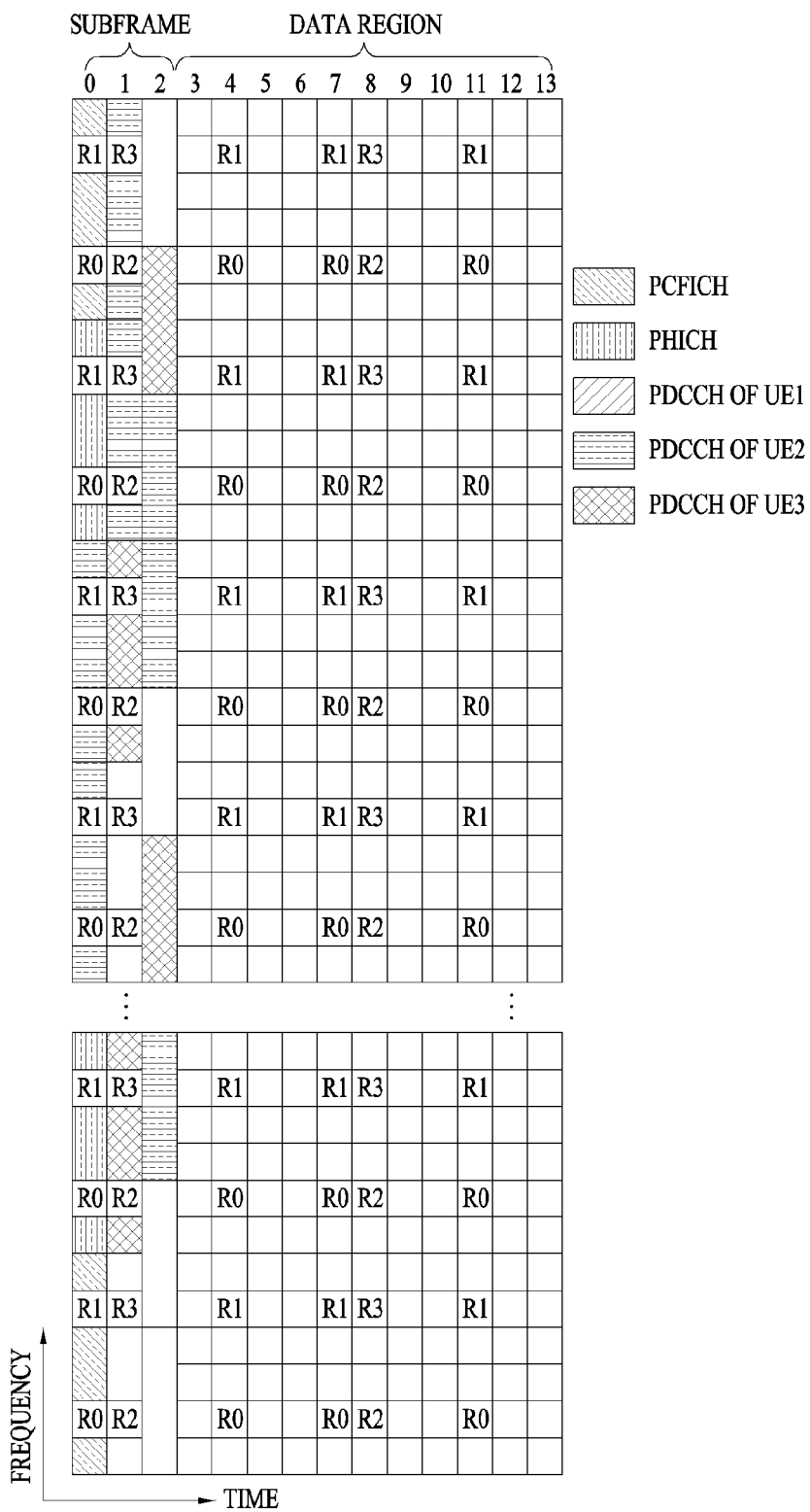
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
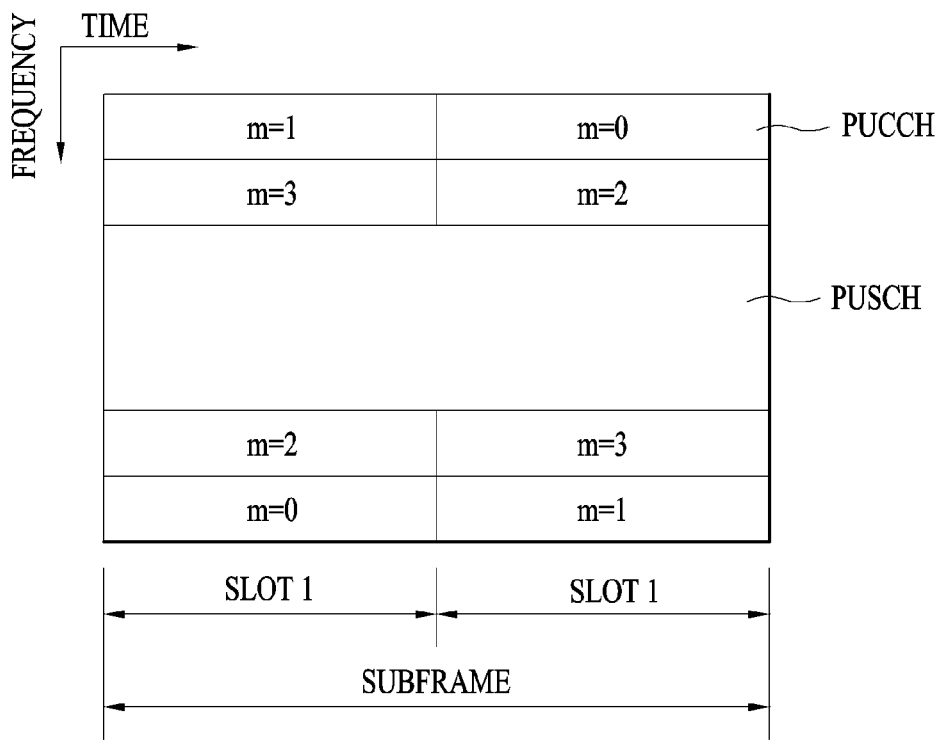
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
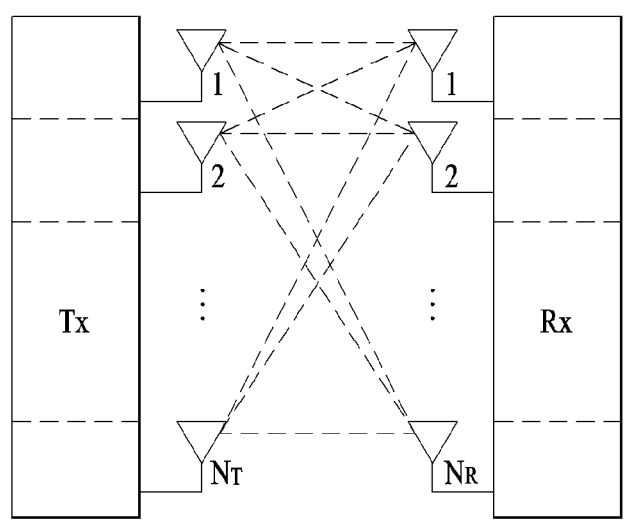
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. The weight matrix W functions to appropriately distribute the transmission information to individual antennas according to transmission channel states, etc. The transmission signals, $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{1_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\# \text{ of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
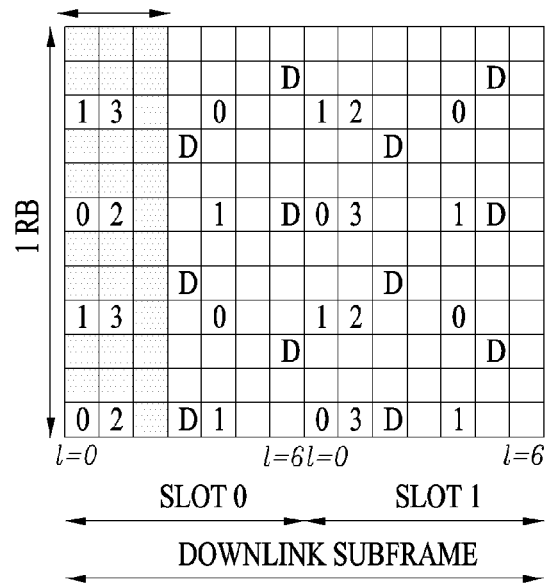
FIGS. 8 and 9 are diagrams illustrating DL RS configurations in an LTE system supporting DL transmission through four antennas.
Figure 9:
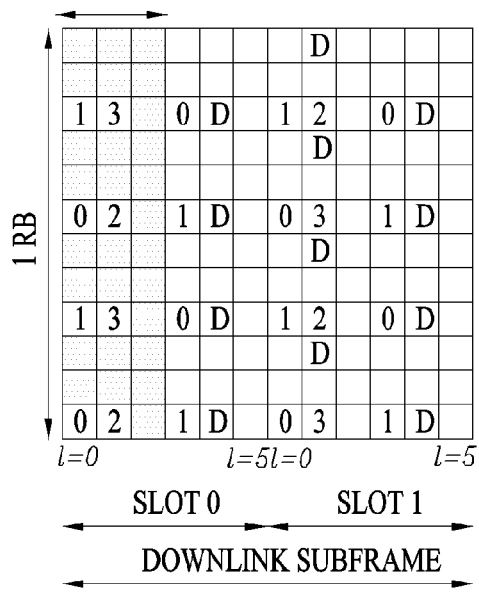

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
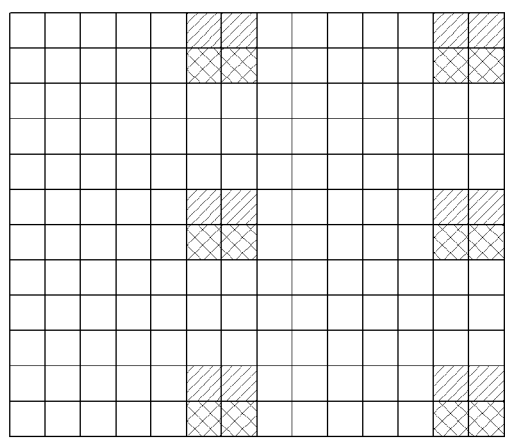
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared to CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RS s according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 1 and Table 2 list CSI-RS configurations defined in the 3GPP standard. Specifically, Table 1 lists CSI-RS configurations in the case of a normal CP and Table 2 lists CSI-RS configurations in the case of an extended CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |

TABLE 1-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
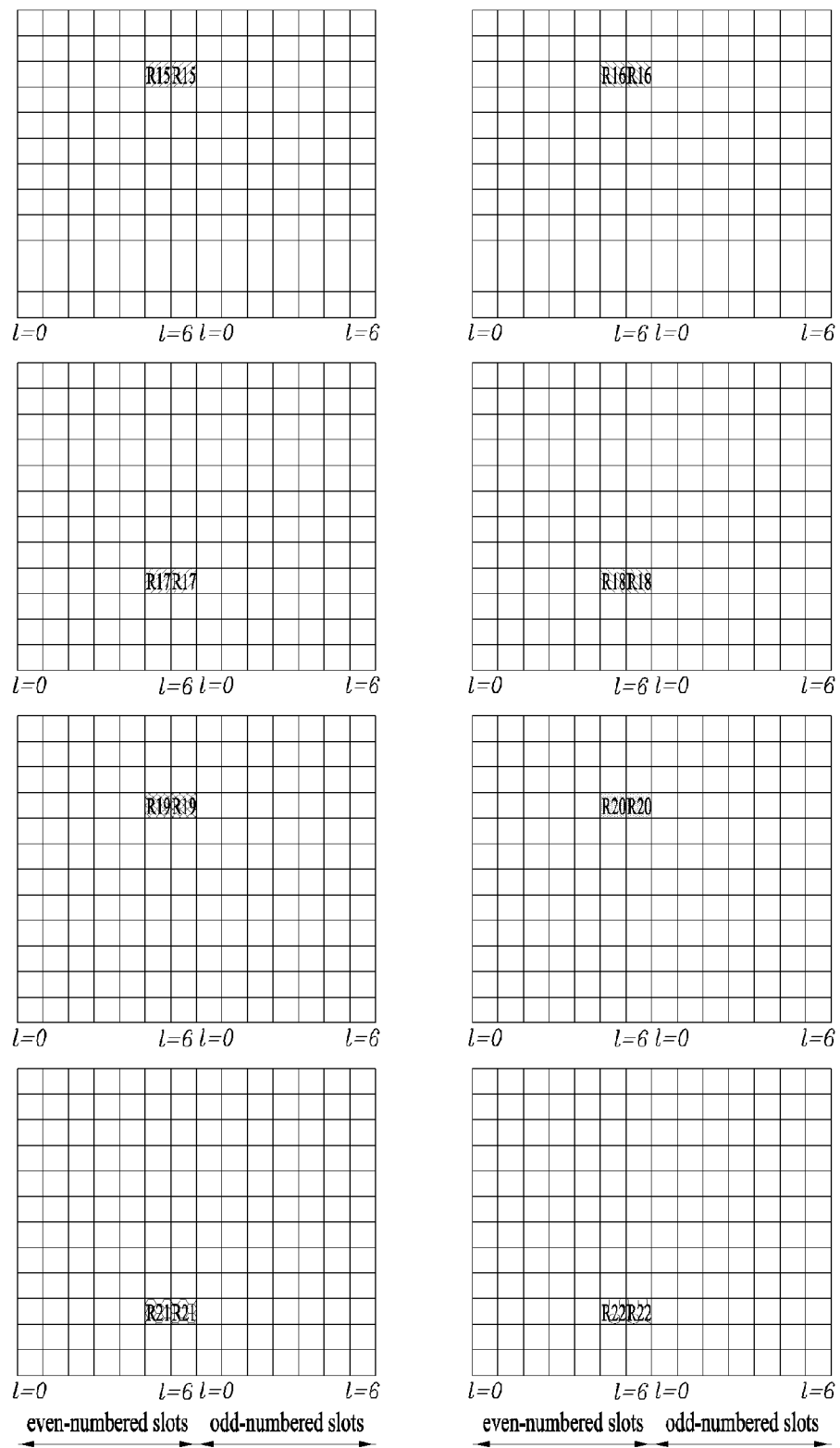
FIG. 11 illustrates CSI-RS configuration #0 of DL CSI-RS configurations defined in the current 3GPP standard.

In Table 1 and Table 2, (k', l') represents an RE index where k' is a subcarrier index and l' is an OFDM symbol index. FIG. 11 illustrates CSI-RS configuration #0 of DL CSI-RS configurations defined in the current 3GPP standard.

In addition, a CSI-RS subframe configuration may be defined by a periodicity in subframes, $T_{CSI-RS}$ and a subframe offset $\Delta_{CSI-RS}$. Table 3 lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Meanwhile, information about a zero power (ZP) CSI-RS illustrated in Table 4 is configured through an RRC layer signal. Particularly, a ZP CSI-RS resource configuration includes zeroTxPowerSubframeConfig and zeroTxPower-ResourceConfigList of a 16-bit bitmap. zeroTxPowerSubframeConfig indicates a CSI-RS transmission periodicity and subframe offset of a ZP CSI-RS by $I_{CSI-RS}$ illustrated in Table 3. zeroTxPowerResourceConfigList indicates a ZP CSI-RS configuration. The elements of this bitmap indicate the respective configurations included in the columns for four CSI-RS antenna ports in Table 1 or Table 2. A normal CSI-RS other than ZP CSI-RS is referred to as non zero-power (NZP) CSI-RS. In other words, according to the current 3GPP standard document, a ZP CSI-RS is defined as only a case in which the number of antenna ports for a CSI-RS is four.

TABLE 4

```
-- ASN1START
CSI-RS-Contig-r10 ::=        SEQUENCE {
    csi-RS-r10               CHOICE {
        ...
    }
    zeroTxPowerCSI-RS r10    CHOICE {
        release                  NULL,
        setup                    SEQUENCE {
```

TABLE 4-continued

```
        zeroTxPowerResourceConfigList-r10    BIT STRING
                                             (SIZE (16)),
        zeroTxPowerSubframeConfig-r10        INTEGER (0..154)
      }
   }
}
-- ASN1STOP
```

The current 3GPP standard defines modulation orders and cording rates for respective CQI indexes as illustrated in Table 5.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A CQI is calculated based on interference measurement as follows.

A UE needs to measure a Signal to Interference and Noise Ratio (SINR) for CQI calculation. In this case, the UE may measure the reception power (S-measure) of a desired signal in an RS such as a Non-Zero Power (NZP) CSI-RS. For interference power measurement (I-measure or Interference Measurement (IM)), the UE measures the power of an interference signal resulting from eliminating the desired signal from a received signal.

CSI measurement subframe sets $C_{CSI,0}$ and $C_{CSI,1}$ may be configured by higher-layer signaling and the subframes of each subframe set are different from the subframes of the other subframe set. In this case, the UE may perform S-measure in an RS such as a CSI-RS without any specific subframe constraint. However, the UE should calculate CQIs separately for the CSI measurement subframe sets $C_{CSI,0}$ and $C_{CSI,1}$ through separate I-measures in the CSI measurement subframe sets $C_{CSI,0}$ and $C_{CSI,1}$.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 12:
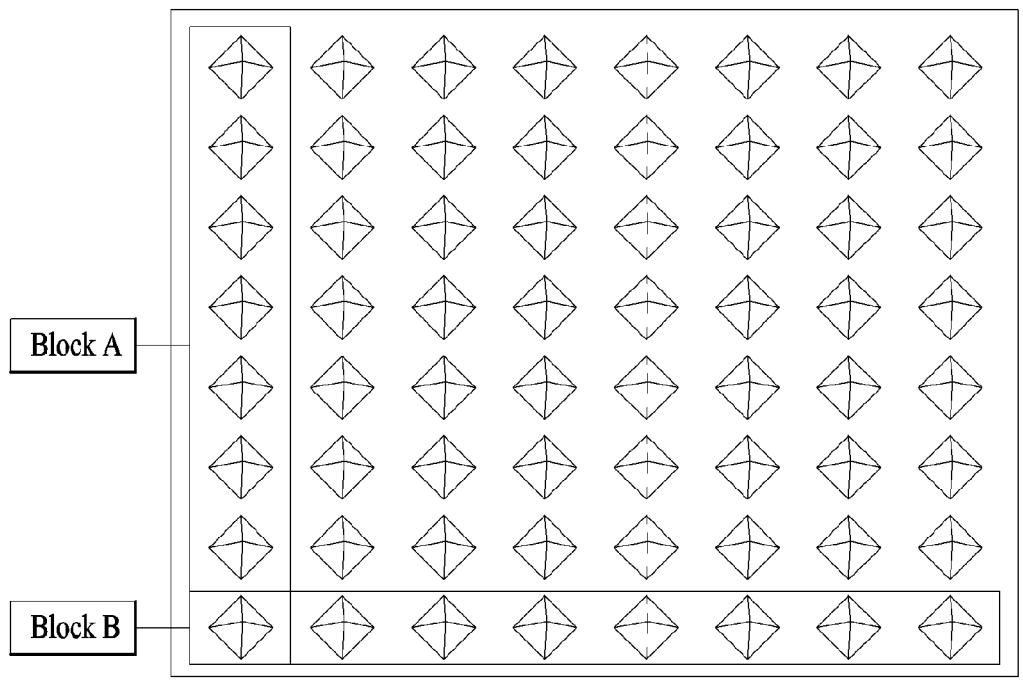
FIG. 12 illustrates an example of implementation of the 2D-AAS.

FIG. 12 illustrates an example of implementation of the 2D-AAS. In particular, FIG. 12 presumes a co-polarized antenna array in which each antenna element has the same polarization.

Referring to FIG. 12, the 2D-AAS is expected to be constructed as a system having a plurality of antennas by installing antennas in a vertical direction and a horizontal direction. When the 2D-AAS is introduced, a transmitting end needs to transmit a particular reference signal (RS) (e.g., a CSI-RS) to report a channel from the transmitting end to a receiving end to the receiving end. In a current LTE system, the CSI-RS is designed as a 1-port, 2-port, 4-port, or 8-port CSI-RS. Each n-ports CSI-RS (n>1) needs to use n REs in one RB.

The 2D-AAS illustrated in FIG. 12 has a total of 64 antennas including eight antennas in the vertical direction and eight antennas in the horizontal direction. In this case, 64 REs need to be used for the CSI-RS in one RB in a conventional scheme. Therefore, CSI-RS overhead according to the number of antennas may be a problem.

In a method proposed to solve this problem, channels from remaining ports are estimated using some CSI-RS ports. There are several schemes for the method. The present invention presumes a circumstance in which a channel from the 2D-AAS to the receiving end is estimated using the Kronecker product as in the following Equation 8.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \quad \text{[Equation 8]}$$

In Equation 8, H denotes a whole channel from the transmitting end to the receiving end, and $H_T^{(j)}$ denotes a channel from the transmitting end to a jth receive antenna. $H_V^{(j)}$ and $H_H^{(j)}$ denote channels transmitted from antenna elements (or ports) in the vertical direction and the horizontal direction to a jth antenna of the receiving end.)

Referring to FIG. 12, $H_V^{(j)}$ denotes channels from antennas of block A to the jth antenna of the receiving end on the assumption that only the antennas of block A are present, and $H_H^{(j)}$ denotes channels from antennas of block B to the jth antenna of the receiving end on the assumption that only the antennas of block B are present. Description is given from the point of view of one arbitrary receive antenna for convenience of description, and all processes are applicable to all other receive antennas.

Hereinafter, description will be given using only a channel from the transmitting end to one arbitrary receive antenna from which an index (j) is eliminated as in the following Equation 9.

$$H_T = H_V \otimes H_H \quad \text{[Equation 9]}$$

Equation 9 is an equation for description of the present invention, and it is clear that the present invention may be applied even when an actual channel is different from Equation 9.

The above-described scheme of estimating a channel using the kronecker product is a method of configuring two CSI-RSs by configuring one CSI-RS having antenna ports $N_V$ in the vertical direction as in block A of FIG. 12 and one CSI-RS having antenna ports $N_H$ in the horizontal direction as in block B of FIG. 12. The receiving end may measure two channel matrices $H_V$ and $H_H$ using the two received CSI-RSs, and then estimate an actual 3D channel using the Kronecker product of the two channel matrices as in Equation 9. $N_V$ denotes the number of antennas in the vertical direction, and $N_H$ denotes the number of antennas in the horizontal direction. When this method is used, it is possible to inform the receiving end of 3D channels from 64 antenna ports using the existing 2-port, 4-port, or 8-port CSI-RS.

Meanwhile, it is possible to consider a cross-polarized antenna array (X-pol AA) instead of the co-polarized antenna array illustrated in FIG. 12.

Figure 13:
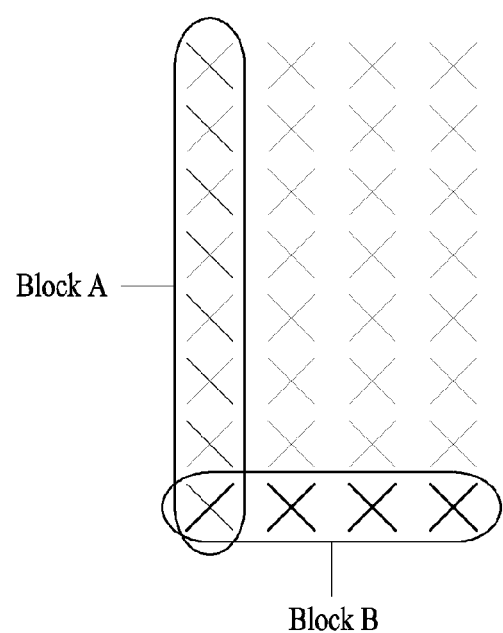
FIG. 13 is an example of implementation of the cross-polarized antenna array having 64 antenna elements.

FIG. 13 is an example of implementation of the cross-polarized antenna array having 64 antenna elements. Similarly to FIG. 12, it can be understood that Group A and Group B are configured for respective antenna arrays in the vertical direction and the horizontal direction.

In summary, in an N-Tx massive MIMO environment in which the base station has a great number of transmit antennas, an N-Tx CSI-RS and an N-Tx PMI need to be newly defined for CSI feedback. However, it may be difficult to newly define the N-Tx CSI-RS and the N-Tx PMI considering RS overhead or feedback overhead. In this regard, the present invention proposes a scheme for supporting massive MIMO feedback using an existing M-Tx (M<N) CSI-RS and M-Tx PMI.

The present invention proposes a new CQI feedback scheme to effectively perform periodic PUCCH CSI feedback in a circumstance in which CSI feedback overhead of a UE is increased. According to the present invention, the UE transmits partial CQIs over several subframes without reporting a whole CQI in one subframe as in a conventional scheme, and a base station generates a whole CQI using the partial CQIs. When the CQI feedback scheme according to the present invention is used, a payload size of a CQI reported by the UE in one subframe decreases, and the UE additionally may use the reduced payload for a more accurate report on a PMI. As a result, the base station may receive more accurate beamforming information reported from the UE, and obtain higher beamforming gain.

As described in the foregoing, CSI feedback overhead greatly increases due to introduction of massive MIMO, etc. As a result, reporting CSI through a periodic PUCCH (e.g. PUCCH format 2), as in current LTE-A, is difficult. A size of a PMI that can be transmitted together with a CQI is merely 4 bits considering that a payload size of PUCCH format 2 is restricted to 11 bits and a payload size for two CQIs is 7 bits. In addition, when a subband CQI is reported, index information of a subband having a size of up to 2 bits is reported together with the CQI. In this instance, a size of a PMI that can be transmitted together with the CQI is merely 2 bits.

However, use of a spatial domain tends to be maximized using more accurate beamforming considering massive MIMO, etc. To this end, the UE needs to report a significantly elaborate PMI. In other words, while a demand for a PMI payload size increases, the demand cannot be satisfied due to restriction on a feedback container size. In this regard, the present invention proposes that a payload size of a CQI that can be transmitted in one subframe be reduced by changing a scheme of reporting the CQI and an extra payload size generated as a result of the reduction be additionally used for PMI transmission.

In the present invention, description is given using massive MIMO as an example for convenience of description. However, the present invention may be applied to other arbitrary environments.

<CSI Process Configuration and Feedback Chain Configuration Method>

A CSI RS and an IMR configured for CSI feedback for a UE in massive MIMO may be divided into two types as below.

First, it is possible to configure a portion of a massive antenna as a CSI-RS in each of a plurality of CSI processes, and make the UE feed a CSI for each process back. For example, CSI process 1 and CSI process 2 are configured for one UE through upper layer signaling, that is, RRC layer signaling. Then, CSI-RS 1 corresponding to block A of FIG. 13 is configured in CSI process 1, and CSI-RS 2 corresponding to block B of FIG. 13 is configured in CSI process 2. CSI process 1 and CSI process 2 may be configured as in the following Table 6.

TABLE 6

$1^{st}$ CSI process information = { IMR configuration, $1^{st}$ CSI-RS configuration}
$2^{nd}$ CSI process information = { IMR configuration, $2^{nd}$ CSI-RS configuration}

In this CSI process configuration, an independent CSI feedback chain may be configured for each CSI process. In other words, an independent feedback period and offset are configured for each process, and a CSI is fed back according to the configured period and offset.

As another massive MIMO feedback scheme, one CSI process is configured for the UE through upper layer signaling, that is, RRC layer signaling, and the UE feeds back an RI, a PMI, and a CQI which can be achieved when the whole massive antenna is used through the CSI process. In this instance, one IMR and L CSI-RSs corresponding to the massive MIMO antenna may be configured in one CSI process. In other words, CSI process-related information may be configured as in the following Table 7.

TABLE 7

CSI process information = { IMR configuration, $1^{st}$ CSI-RS configuration, $2^{nd}$ CSI-RS configuration}

One CSI feedback chain corresponding to the CSI process of the above Table 7 may be configured. In other words, one feedback period and one offset corresponding to the CSI process are configured for the UE, and a CSI is fed back according to the configured period and offset.

Alternatively, two feedback chains may be configured for one CSI process. For example, a feedback chain for reporting a CSI which is calculated using {IMR configuration, $1^{st}$ CSI-RS configuration} and a feedback chain for reporting a CSI which is calculated using {IMR configuration, $2^{nd}$ CSI-RS configuration} are separately configured, and the UE feeds the CSIs back through the two feedback chains. In particular, a feedback period and offset may be independently configured according to a CSI-RS in one CSI process.

Hereinafter, a description will be given of a method of reporting a partial CQI based on the above-described CSI process configuration method. When a reporting period of the CQI B is configured as $N_{pd}$, a reporting period of the CQI A may be configured as a multiple of $N_{pd}$. Further, an offset related to reporting period of the CQI B may be configured as a same value with an offset related to reporting period of the CQI A. In this case, when reporting CQI A, a collision between CQI A and CQI B may be occurred. Thus, for resolving the collision, the UE may report CQI A without CQI B.

Figure 14:
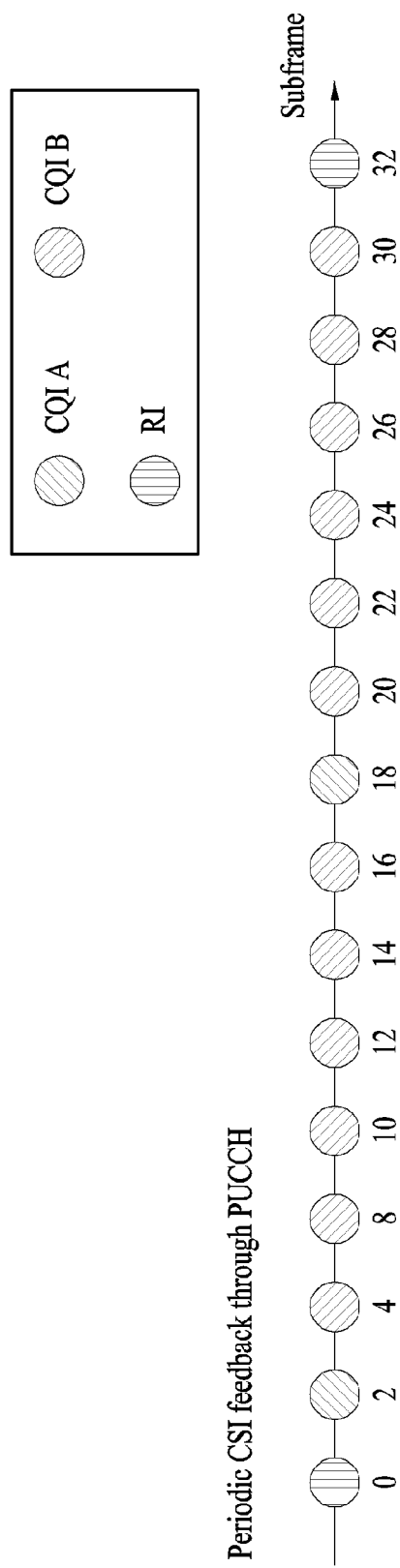
FIG. 14 illustrates an example of a method of feeding a partial CQI back according to an embodiment of the present invention.

FIG. 14 illustrates an example of a method of feeding a partial CQI back according to an embodiment of the present invention. In particular, in FIG. 14, it is presumed that one CSI feedback chain is configured for periodic CSI feedback through a PUCCH.

Referring to FIG. 14, a UE reports a CSI for a whole massive MIMO channel through one feedback chain. In FIG. 14, reporting periods of CQI A, CQI B, and an RI are 16 ms, 2 ms, and 32 ms, respectively, and an offset is 0.

In an existing scheme, a maximum of two CQIs is reported by occupying a payload of a maximum of 7 bits in one subframe. On the other hand, referring to FIG. 14, a payload is dispersed by appropriately dividing a whole CQI into two information items of CQI A and CQI B, and the UE combines CQI A and CQI B to report a final CQI, which can be achieved by the UE, to a base station.

Additionally, referring to FIG. 14, a PMI may be reported together with CQI A or CQI B. As a result, more accurate PMI feedback may be achieved by allocating more bits to the PMI. For example, a current LTE 8 Tx codebook is defined as a PMI having a size of a maximum of 8 bits, and the PMI having a large size may be reported without sub-sampling.

Figure 15:
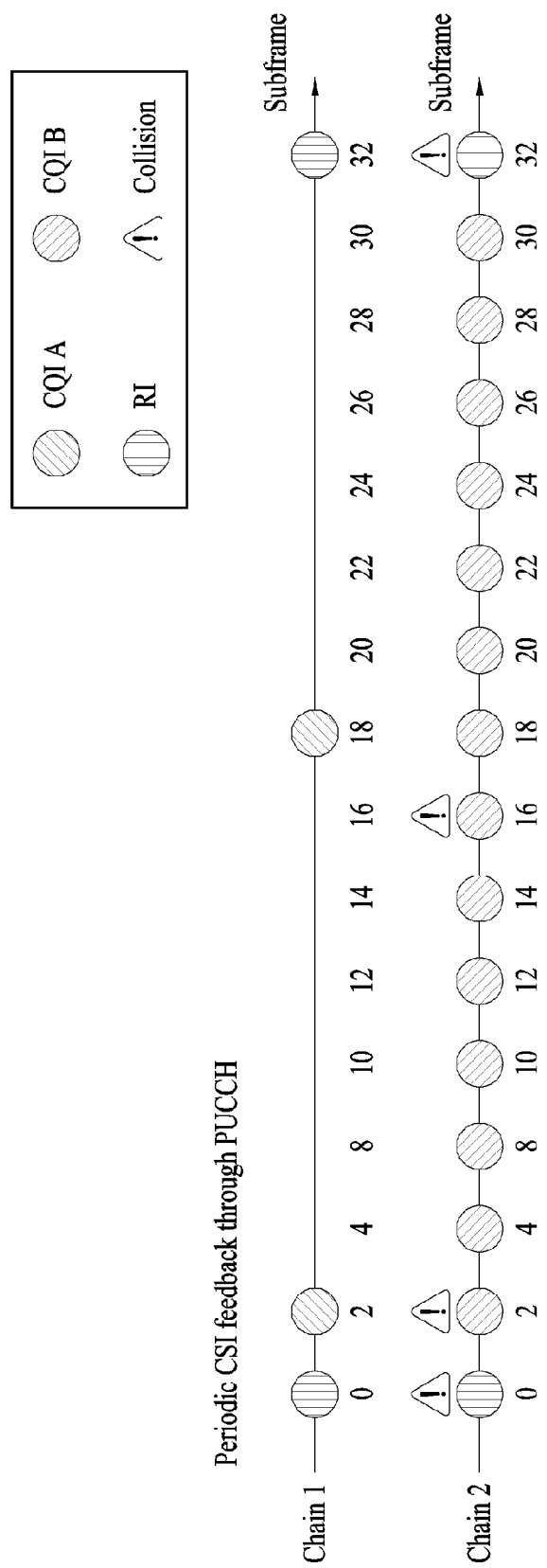
FIG. 15 illustrates another example of a method of feeding a partial CQI back according to an embodiment of the present invention.

FIG. 15 illustrates another example of a method of feeding a partial CQI back according to an embodiment of the present invention. In particular, in FIG. 15, it is presumed that two CSI feedback chains are configured for periodic CSI feedback through a PUCCH.

Referring to FIG. 15, a UE separately reports CSIs for a whole massive MIMO channel through two feedback chains. When an upper feedback chain is referred to as feedback chain 1, and a lower feedback chain is referred to as feedback chain 2, reporting periods of CQI A and an RI of feedback chain 1 are 16 ms and 32 ms, respectively, and an offset thereof is 0. In addition, reporting periods of CQI B and an RI of feedback chain 2 are 2 ms and 32 ms, respectively, and an offset thereof is 0. When a reporting period of the CQI B is configured as $N_{pd}$, a reporting period of the CQI A may be configured as a multiple of $N_{pd}$. Further, an offset related to reporting period of the CQI B may be configured as a same value with an offset related to reporting period of the CQI A. In this case, when reporting CQI A, a collision between CQI A and CQI B may be occurred. Thus, for resolving the collision, the UE may report CQI A without CQI B.

In general, a CSI transmitted in one feedback chain is calculated independently of a CSI transmitted in another feedback chain. However, when CSI payload and RS overhead for a whole channel such as massive MIMO are extremely heavy, and thus CSIs are reported through several feedback chains, the CSIs reported through the several feedback chains may be exceptively dependent on each other. This dependency may occur for all of RIs, PMIs, and CQIs.

<RI Dependency>

For example, RIs transmitted through feedback chain 1 and feedback chain 2 are calculated as RIs which can be achieved in a whole channel without being separately calculated as optimal RIs which can be achieved through channels estimated using CSI-RS 1 and CSI-RS 2, respectively. The RIs are referred to as complete RIs. An RI which can be achieved in a whole channel refers to an RI of a whole channel in which a portion of the channel is measured using CSI-RS 1 and CSI-RS 2 and an invisible remaining channel is estimated from CSI-RS 1 and CSI-RS 2.

More specifically, FIG. 15 illustrates that RIs of two feedback chains collide with each other in subframe 0 and subframe 32. In this case, a complete RI may be transmitted through one feedback chain. In addition, the base station configures a feedback period and offset to intentionally cause a collision between RIs of the two feedback chains in order to receive a report on the complete RI, and the UE ignores a rule in which one of the RIs of the two feedback chains is reported and the other one is dropped. In other words, in this case, the UE reports an RI having a new form referred to as a complete RI without selecting and reporting one of the RIs of the two feedback chains.

<CQI Dependency>

Referring to FIG. 15, feedback chain 1 and feedback chain 2 transmit CQI A and CQI B, respectively. When a CQI which can be obtained by the UE through a whole channel is referred to as a complete CQI, the UE appropriately divides the complete CQI into CQI A and CQI B, and the base station calculates the complete CQI from CQI A and CQI B. A scheme in which the UE divides the complete CQI into CQI A and CQI B will be described below.

In addition, when CQI collision occurs in subframe 2 and subframe 18 as in FIG. 15, only a CQI having a higher priority is reported according to a predetermined rule. For example, CQI A is reported with priority. In FIG. 15, two CQIs collide with each other at all times. However, this is merely an example, and it is preferable that the base station configure a period and an offset such that collision between two CQIs is minimized.

<PMI Dependency>

Even though a PMI is omitted in FIG. 15, the PMI may be transmitted together with a CQI. In this instance, calculations of PMIs transmitted in feedback chain 1 and feedback chain 2, respectively, may affect each other. For example, when the UE calculates a PMI of feedback chain 1, the UE calculates an optimal PMI of feedback chain 1 for a whole channel on the assumption of a PMI most recently reported in feedback chain 2. Similarly, a most recently reported PMI of feedback chain 1 is used when a PMI of feedback chain 2 is calculated. Further, if only one feedback chain is configured such as FIG. 14, a PMI transmitted with CQI A and a PMI transmitted with CQI B may be calculated based on the above-mentioned PMI dependency.

Hereinafter, a method of configuring a partial CQI is described.

(1) First, CQI A may be configured to report CQI range information for a complete CQI, and CQI B may be configured to report index information of a complete CQI in a corresponding range.

A description will be given using a CQI table having a size of 4 bits of Table 5 defined in the current LTE standard document as an example. CQI A reports a range of CQI indices selectable through CQI B among 16 CQI indices in total. For example, CQI A is configured to have a size of 2 bits such that 00, 01, 10, and 11 indicate CQI indices 0 to 3, CQI indices 4 to 7, CQI indices 8 to 11, and CQI indices 12 to 15, respectively. The UE reporting CQI A may thereafter report a complete CQI index in each range through CQI B having a size of 2 bits.

When a CQI is reported for two codewords, CQI A and CQI B may be defined for each codeword. In addition, in order to further reduce a payload, CQI A may be defined as a value common to the two codewords, and CQI B may be defined for each of the two codewords. In this instance, both CQI B for a first codeword and CQI B for a second codeword are determined with reference to CQI A. Alternatively, CQI B for the first codeword may be determined with reference to CQI A, and CQI B for the second codeword may indicate an index change amount based on CQI B for the first codeword.

Alternatively, CQI A and CQI B may be defined for each of the two codewords. Here, CQI A may be determined for the first codeword, and then CQI A for the second codeword may indicate a change amount of a range based on CQI A for the first codeword. CQI B of each codeword is determined using CQI A of a corresponding codeword.

(2) Alternatively, CQI A may be configured to report long-term/wideband CQI index information for a complete CQI, and CQI B may be configured to report a change amount from CQI A.

As a result, it can be understood that, even though scheme (2) operates similarly to scheme (1), definitions of CQI A and CQI B are changed. However, when compared to CQI A of scheme (1), CQI A calculated using scheme (2) selects one of sixteen CQI indices in total, and thus has the same payload as an existing CQI payload. In other words, when compared to an existing scheme of being reported together with CQI A, the same PMI uses a payload.

When a PMI for a vertical channel and a PMI for a horizontal channel are reported in the massive MIMO environment as in the above example, it is preferable that one of the PMIs having a smaller codebook size be reported together with CQI A and the other PMI be reported together with CQI B.

For example, CQI B may be expressed by a size of 2 bits in which 00, 01, 10, and 11 indicate index changes corresponding to +1, 0, −1, and −2, respectively, based on CQI A. More negative values are present than positive values since expressing a low CQI more significantly affects performance. For example, when a CQI that can be achieved by the UE is lower than a CQI index that can be indicated by CQI B, the base station transmits data at a higher modulation and coding scheme (MCS) level than a current channel state, and thus the UE fails in decoding the data. In order to minimize decoding failure, CQI B may be designed such that an index change expressed by a negative value is elaborately fed back.

Additionally, the UE may report, through CQI B, an indicator indicating that a currently calculated CQI is lower than a lowest CQI index which can be expressed by CQI B. For example, values of 000, 001, 010, and 011 of CQI B may indicate index changes corresponding to +1, 0, −1, and −2, respectively, based on CQI A, and a value of 100 of CQI B may indicate information indicating that a currently calculated CQI is lower than a lowest CQI index which can be expressed by CQI B. The base station receiving the value of 100 may conservatively configure an MCS. Thereafter, when the base station receives NACK from the UE, the base station may attempt data transmission using an MCS having a significantly low level by setting a down step size of open loop link adaptation (OLLA) to a greater value.

(3) Alternatively, some x bits of a complete CQI having a size of n bits are fed back as CQI-A, and the other (n-x) bits are fed back as CQI-B.

While the above scheme (3) is ineffective in an asymmetric structure in which feedback periods of CQI A and CQI B are different from each other as in FIGS. 14 and 15, scheme (3) may be effective in a symmetric structure in which feedback periods of CQI A and CQI B are similar or the same. For example, it is possible to consider a scheme in which all CQI bits are separately transmitted in two subframes when CQI A and CQI B have the same period and are alternately transmitted with a small offset difference.

(4) Lastly, CQI-A may be configured as a CQI for a first codeword, and CQI-B may be configured as a CQI for a second codeword. Similarly to scheme (3), this scheme is effective in a symmetric structure in which feedback periods of CQI A and CQI B are similar or the same. For example, it is possible to consider a scheme in which a CQI is separately transmitted in two subframes to the two codewords when CQI A and CQI B have the same period and are alternately transmitted with a small offset difference.

However, these schemes may be restrictively applied to a case in which a plurality number of transmission codewords is present. In single codeword transmission, a CQI payload is not great, and thus a complete CQI is fed back using an existing scheme. On the other hand, when a plurality number of codewords are present, a CQI payload is great, and thus the schemes proposed above are effectively used.

The present invention proposes a new CQI feedback scheme to effectively perform periodic PUCCH CSI feedback in a circumstance in which CSI feedback overhead of a UE is increased. In other words, the UE transmits partial CQIs over several subframes without reporting a whole CQI in one subframe as in a conventional scheme, and a base station generates a whole CQI using the partial CQIs. When the proposed CQI feedback scheme is used, a payload size of a CQI reported by the UE in one subframe decreases, and the UE may additionally use the reduced payload for a more accurate report on a PMI. In addition, the base station may receive more accurate beamforming information reported from the UE, and obtain higher beamforming gain.

Although the CQI A and CQI B are configured by dividing one CQI information, but the present invention is not limited to the aforementioned description. That is, the present invention can be extended to two CQIs which are calculated under different channels or different assumptions. Here, the two CQIs may be referred to CQI A and CQI B, respectively. Furthermore, CQI A and CQI B in FIGS. 14 and 15 may be interpreted as two CQIs which are calculated under different channels or different assumptions. For example, a CSI-RS resource 1 and a CSI-RS resource 2 which is different from the CSI-RS resource 1 are configured to the UE, and then a CQI calculated from the CSI-RS resource 1 and a CQI calculated from the CSI-RS resource 2 can be referred to CQI A and CQI B, respectively. In this case, the present invention can be extended to the CQI A and the CQI B. Furthermore, CQI A and CQI B in FIGS. 14 and 15 may be interpreted as two CQIs which are calculated by using different CSI-RS resources.

As another example, a CQI A may be defined as a CQI which is achieved by the UE under assumption of a specific transmission scheme or a specific reception scheme, and a CQI B may be defined as a CQI which is achieved by the UE under assumption of another transmission scheme or another reception scheme. For example, when a base station can transmit signals to a plurality of UEs via same frequency/time resources by using a MUST (multiuser superposition transmission) scheme in 5G communication system, the present invention can be extended to a CQI A which is achieved under assumption that the base station uses the MUST scheme and a CQI B which is achieved under assumption that the base station does not use the MUST scheme. The CQI which is achieved under assumption that the base station uses the MUST scheme indicates a CQI which is achieved by assuming a transmission power for a data of a MUST UE which is transmitted with a data of the UE as a specific value. In this case, if the UE is able to cancel interference from another UE, the CQI which is achieved under assumption that the base station uses the MUST scheme indicates a CQI which is achieved by canceling the interference additionally.

Figure 16:
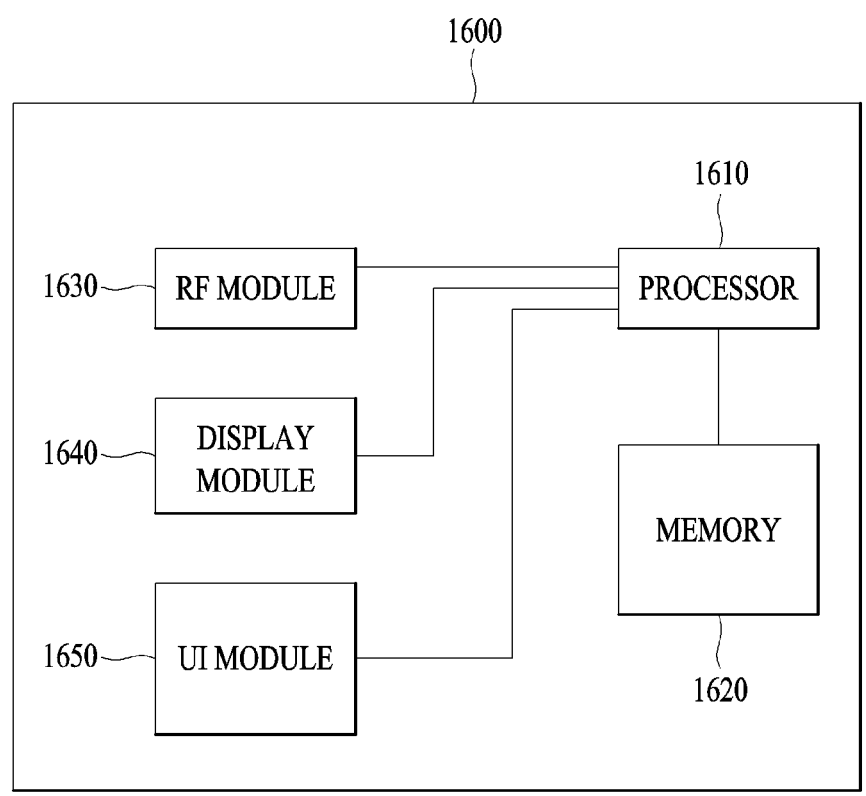
FIG. 16 is a block diagram of a communication apparatus according to an embodiment of the present invention.

FIG. 16 is a block diagram of a communication apparatus according to an embodiment of the present invention.

Referring to FIG. 16, a communication apparatus 1600 includes a processor 1610, a memory 1620, an RF module 1630, a display module 1640, and a User Interface (UI) module 1650.

The communication device 1600 is shown as having the configuration illustrated in FIG. 16, for the convenience of description. Some modules may be added to or omitted from the communication apparatus 1600. In addition, a module of the communication apparatus 1600 may be divided into more modules. The processor 1610 is configured to perform operations according to the embodiments of the present invention described before with reference to the drawings. Specifically, for detailed operations of the processor 1610, the descriptions of FIGS. 1 to 15 may be referred to.

The memory 1620 is connected to the processor 1610 and stores an Operating System (OS), applications, program codes, data, etc. The RF module 1630, which is connected to the processor 1610, upconverts a baseband signal to an RF signal or downconverts an RF signal to a baseband signal. For this purpose, the RF module 1630 performs digital-to-analog conversion, amplification, filtering, and frequency upconversion or performs these processes reversely. The display module 1640 is connected to the processor 1610 and displays various types of information. The display module 1640 may be configured as, not limited to, a known component such as a Liquid Crystal Display (LCD), a Light Emitting Diode (LED) display, and an Organic Light Emitting Diode (OLED) display. The UI module 1650 is connected to the processor 1610 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

A method and apparatus for feeding a partial CQI back by a terminal in a wireless communication system has been described focusing on an example in which the method and apparatus are applied to 3GPP LTE. However, the method and apparatus are applicable to various wireless communication systems in addition to 3GPP LTE.

What is claimed is:

1. A method of reporting channel state information (CSI) to a base station by a terminal in a wireless communication system, the method comprising:
configuring feedback chains corresponding to a plurality of CSI-reference signals (RSs) through upper layer signaling;
receiving the plurality of CSI-RSs from the base station;
calculating a complete channel quality indicator (CQI) for a whole channel using the plurality of CSI-RSs and dividing the complete CQI into partial CQIs corresponding to the respective feedback chains; and
reporting CSI items including the partial CQIs to the base station through the feedback chains.

2. The method according to claim 1, further comprising:
calculating partial rank indicators (RIs) corresponding to the plurality of CSI-RSs; and
reporting the partial RIs to the base station through the feedback chains.

3. The method according to claim 2, wherein the reporting of the partial RIs includes reporting a complete RI for a whole channel through one of the feedback chains.

4. The method according to claim 1, wherein the base station acquires the complete CQI for the whole channel using the partial CQIs corresponding to the respective feedback chains.

5. The method according to claim 1, wherein the CSI items including the partial CQIs include information about partial precoding matrix indices (PMIs).

6. The method according to claim 5, wherein the partial PMIs include a PMI for a vertical channel and a PMI for a horizontal channel.

7. A method of receiving channel state information (CSI) from a terminal by a base station in a wireless communication system, the method comprising:

configuring feedback chains corresponding to a plurality of CSI-reference signals (RSs) through upper layer signaling;

transmitting the plurality of CSI-RSs to the terminal;

receiving partial channel quality indicators (CQIs) of a complete CQI for a whole channel calculated using the plurality of CSI-RSs from the terminal through the feedback chains; and acquiring the complete CQI for the whole channel using the partial CQIs.

8. The method according to claim 7, further comprising receiving partial RIs corresponding to the plurality of CSI-RSs from the terminal through the feedback chains.

9. The method according to claim 8, wherein the receiving of the partial RIs includes receiving a complete rank indicator (RI) for a whole channel through one of the feedback chains.

10. The method according to claim 7, wherein CSI items including the partial CQIs include information about partial precoding matrix indices (PMIs).

11. The method according to claim 10, wherein the partial PMIs include a PMI for a vertical channel and a PMI for a horizontal channel.

\* \* \* \* \*